(12) United States Patent
Ieraci

(10) Patent No.: US 12,702,095 B2
(45) Date of Patent: Aug. 11, 2026

(54) VEGETABLE SUPPORT APPARATUS

(71) Applicant: Bruno Ieraci, Valley Stream, NY (US)

(72) Inventor: Bruno Ieraci, Valley Stream, NY (US)

( * ) Notice: Subject to any disclaimer, the term of this patent is extended or adjusted under 35 U.S.C. 154(b) by 0 days.

(21) Appl. No.: 18/744,863

(22) Filed: Jun. 17, 2024

(65) Prior Publication Data

US 2025/0255224 A1 Aug. 14, 2025

Related U.S. Application Data

(60) Provisional application No. 63/552,871, filed on Feb. 13, 2024.

(51) Int. Cl.

*A01G 9/12* (2006.01)
*A01B 1/20* (2006.01)
*A01C 5/02* (2006.01)
*A01G 3/00* (2006.01)
*A01G 25/02* (2006.01)

(52) U.S. Cl.

CPC .................. *A01G 9/12* (2013.01); *A01B 1/20* (2013.01); *A01G 3/00* (2013.01); *A01G 25/023* (2013.01); *A01C 5/02* (2013.01)

(58) Field of Classification Search

CPC . A01G 3/00; A01G 9/12; A01G 9/122; A01G 17/04; A01G 25/023; A01B 1/00; A01B 1/022; A01B 1/10; A01B 1/16; A01B 1/20; A01C 5/02; A01C 7/002; A01C 7/02

USPC .............................................................. 47/47

See application file for complete search history.

(56) References Cited

U.S. PATENT DOCUMENTS 66,807 A * 7/1867 Darling .................. A01D 46/26 56/329
171,252 A * 12/1875 Woodward ............. A01B 1/022 294/51
1,359,148 A * 11/1920 Bertrand .................. A01G 5/00 30/146
2,806,325 A * 9/1957 Fox .......................... A01G 5/00 47/1.01 R
3,242,513 A * 3/1966 Janke ....................... A01B 1/20 294/51
4,213,272 A * 7/1980 Nievelt .................... A01G 9/12 47/45

(Continued)

FOREIGN PATENT DOCUMENTS

CA 2451544 C * 8/2004 ............... A01B 1/00
CN 107787722 A * 3/2018 ............... A01G 9/12

(Continued)

*Primary Examiner* — Kimberly S Berona
*Assistant Examiner* — Erica Michelle Huebner
(74) *Attorney, Agent, or Firm* — Shore IP Group, PLLC; Sean R. Wilsusen

(57) ABSTRACT

A multifunctional gardening device designed to support vegetables includes a vegetable support member with a sidewall featuring at least one aperture, which may receive a vertical support member, thereby securing the vegetable support member in place. Extending from the sidewall is a base member characterized by a curved shape, forming the bottom surface of the vegetable support member. The vegetable support member also incorporates a distal end portion of the base member, projecting away from the sidewall, which defines a curved profile. Additionally, the base member is equipped with at least one second aperture on its bottom surface, purposed for facilitating fluid drainage.

19 Claims, 13 Drawing Sheets

(56) References Cited

U.S. PATENT DOCUMENTS 4,348,831 A * 9/1982 Chambers ................ A01G 9/12 47/24.1
4,386,480 A * 6/1983 Horowitz ............... A01G 9/122 428/22
4,466,560 A * 8/1984 Boram ..................... A01C 7/02 222/196
5,276,996 A * 1/1994 Lee .......................... A01G 9/12 47/45
5,383,696 A * 1/1995 Speier ...................... A01B 1/20 209/419
5,561,904 A * 10/1996 Chung ..................... A01G 5/00 30/253
5,581,889 A * 12/1996 Reuter ..................... A01G 3/08 30/142
7,003,913 B1 * 2/2006 Smith ...................... A01G 9/12 47/24.1
8,813,422 B1 * 8/2014 Laudenklos ............. A01G 9/12 47/47
8,881,452 B2 * 11/2014 Pacholyk ............... A01G 17/04 211/187
9,439,337 B1 * 9/2016 Padden .................. A01B 1/022
11,071,256 B2 * 7/2021 Calle .................... A01G 25/023
11,464,175 B1 * 10/2022 Clarke ............... A01G 13/0237
2005/0133230 A1 * 6/2005 Sheehan .................. A01B 1/12 172/378
2015/0366122 A1 * 12/2015 Vera Andrades ...... A01B 1/022 294/51
2021/0345557 A1 * 11/2021 Vyas ...................... A01G 9/122
2022/0174896 A1 * 6/2022 Keegan ................ A01G 25/023
2023/0354727 A1 * 11/2023 Cordes ..................... A01B 1/20
2025/0160546 A1 * 5/2025 Ghobrial .................. A47G 7/02

FOREIGN PATENT DOCUMENTS

EP 2875722 A1 * 5/2015 ............. A01G 17/04
KR 100987607 B1 * 10/2010
KR 20120124099 A * 11/2012
KR 20200059072 A * 5/2020
SE 523668 C2 * 5/2004 ............. A01B 1/022
WO WO-2007048360 A1 * 5/2007 ............. A01B 1/022
WO WO-2020151264 A1 * 7/2020 ............. A01B 1/022

* cited by examiner 101
108
106
102
126
129

227
201
208
206
236
202
226

301
308
306
336
302
326

VEGETABLE SUPPORT APPARATUS

CROSS-REFERENCE TO RELATED APPLICATION

The present Non-Provisional patent application claims priority to U.S. Provisional Patent Application No. 63/552,871, filed on Feb. 13, 2024, the entire contents of which are incorporated by reference herein.

FIELD

The present disclosure relates to an agricultural apparatus, and more particularly, to a system and method of supporting vegetables or other plants.

BACKGROUND

Cultivating vegetable or fruit-bearing plants presents unique challenges, particularly in supporting the plants as they grow to maturity. Traditional support methods, such as wooden stakes, trellises, and wire cages, have been commonly used by gardeners and commercial growers. These conventional means, while somewhat effective, have several drawbacks. They often fail to provide adequate support to the growing plants, leading to bent or broken stems, reduced air circulation, and increased susceptibility to diseases and pests. Additionally, these methods can be labor-intensive to set up and maintain and may not be easily adaptable to the varying growth patterns of different plant species. There is a recognized need for a more efficient, flexible, and robust support system that can accommodate the dynamic needs of various vegetable and fruit-bearing plants, thereby enhancing plant health, facilitating easier maintenance, and potentially increasing yield. Addressing these needs, the proposed support apparatus not only provides effective vegetable plant support but also incorporates multiple functionalities to enhance overall gardening efficiency.

SUMMARY

Provided in accordance with aspects of the present disclosure is a multifunctional gardening device for supporting vegetables. The vegetable support assembly includes a vertical support member and a vegetable support member arranged along the vertical support member. The vegetable support member includes a first sidewall that defines at least one first aperture. The first aperture is configured to receive the vertical support member, thereby securing the vegetable support member to the vertical support member. The base member extends from the first sidewall. The base member defines the vegetable support member's curved bottom surface. Additionally, the base member defines a distal end portion facing away from the first sidewall. The base member's distal end defines a curved shape facing away from the first sidewall. At least one second aperture is defined on the bottom surface of the base member. The second aperture is configured to drain fluid through the base member.

In an aspect of the present disclosure, the first sidewall defines a plurality of first apertures wherein each first aperture is configured to receive the vertical support member.

In an aspect of the present disclosure, the base member defines at least one first cradle and at least one second cradle. The first and second cradles are individually configured to support a vegetable. At least one second sidewall extends orthogonally from the base member. The second sidewall at least partially separates the first and second cradles.

In an aspect of the present disclosure, the at least one second aperture includes a plurality of second apertures. The second apertures in the plurality of second apertures each define different diameters.

In an aspect of the present disclosure, the at least one second aperture defines a projecting sidewall. The projecting sidewall extends downward from the base member's bottom surface. The downward projecting sidewall is configured to sheer thorns from a stem as the stem is pulled upwardly through the at least one second aperture.

In an aspect of the present disclosure, a downwardly angled recess is formed in the base member. The downwardly angled recess is configured to direct water into the at least one second aperture.

In an aspect of the present disclosure, the base member includes at least one cutout or notch on at least one side of the base member. The at least one cutout or notch is configured to support a plant hook.

In an aspect of the present disclosure, the base member includes at least one cutting edge defined in at least one side of the base member.

In an aspect of the present disclosure, the at least one cutting edge includes a plurality of teeth defining a serrated edge.

In an aspect of the present disclosure, the first sidewall includes at least one handle extending from the first sidewall. The vegetable support member is configured to operate as a shovel while a user is holding the handle.

In an aspect of the present disclosure, the distal end of the base member defines at least one distal-facing notch. The at least one distal-facing notch is configured to securely grip a root.

In an aspect of the present disclosure, the vegetable support assembly includes a threaded bore defining at least one handle. Additionally, a dibber is configured to be removably coupled with the threaded bore of the handle. The dibber is configured to form a hole in a planting substrate.

In an aspect of the present disclosure, the dibber includes a plurality of fins extending from the dibber's sidewall. The fins of the plurality of fins are configured to remove material from the hole.

In an aspect of the present disclosure, the base member, dibber, or both defines a plurality of measurement markings configured to indicate a depth of insertion into soil.

In an aspect of the present disclosure, the vegetable support assembly includes at least one threaded bolt configured to be threaded into at least one bore extending into the at least one first aperture, allowing the vegetable support member to be removably couplable to the vertical support member.

In an aspect of the present disclosure, the vegetable support member includes at least one projection extending downwards from the bottom surface of the base member. The at least one projection is configured to connect with at least one string or rope.

In an aspect of the present disclosure, the vegetable support assembly includes at least one handle extending from the first sidewall. The vegetable support member is configured to operate as a shovel by holding the handle. The threaded bore is defined in the at least one handle, where the threaded bore is configured to removably receive and support at least one accessory product.

In an aspect of the present disclosure, the vegetable support member includes a hose support bracket arranged at the distal end portion of the base member. A hose receiving orifice is defined in the first sidewall.

In an aspect of the present disclosure, a second hose receiving orifice is defined in the dibber.

In an aspect of the present disclosure, a hose is configured to extend from the hose support bracket and through the hose receiving orifice and the second hose receiving orifice.

In an aspect of the present disclosure, a nozzle is supported at a distal end of the hose and a hose connecting assembly configured to connect the hose with a source of water is arranged at a proximal end of the hose.

BRIEF DESCRIPTION OF THE DRAWINGS

Various aspects and features of the present disclosure are described hereinbelow with reference to the drawings wherein.

DETAILED DESCRIPTION

Figure 1A:
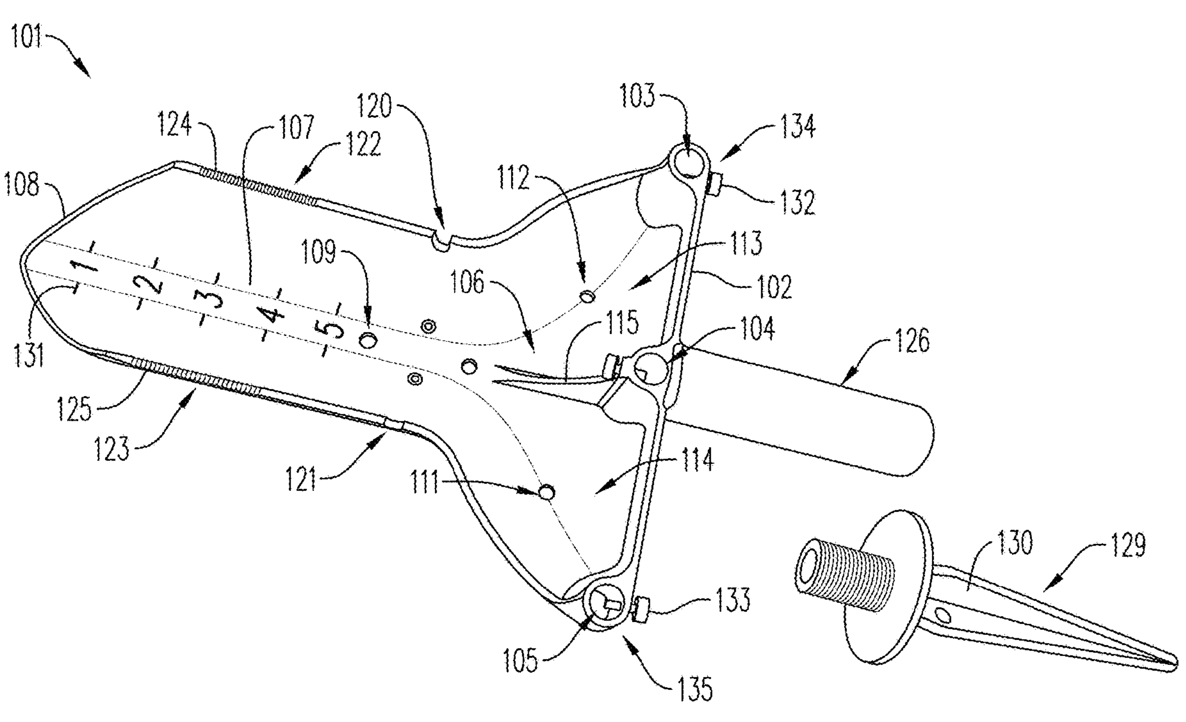
FIG. 1A is a top, perspective view of the vegetable support member, including a detachable dibber according to aspects of the present disclosure.
Figure 1B:
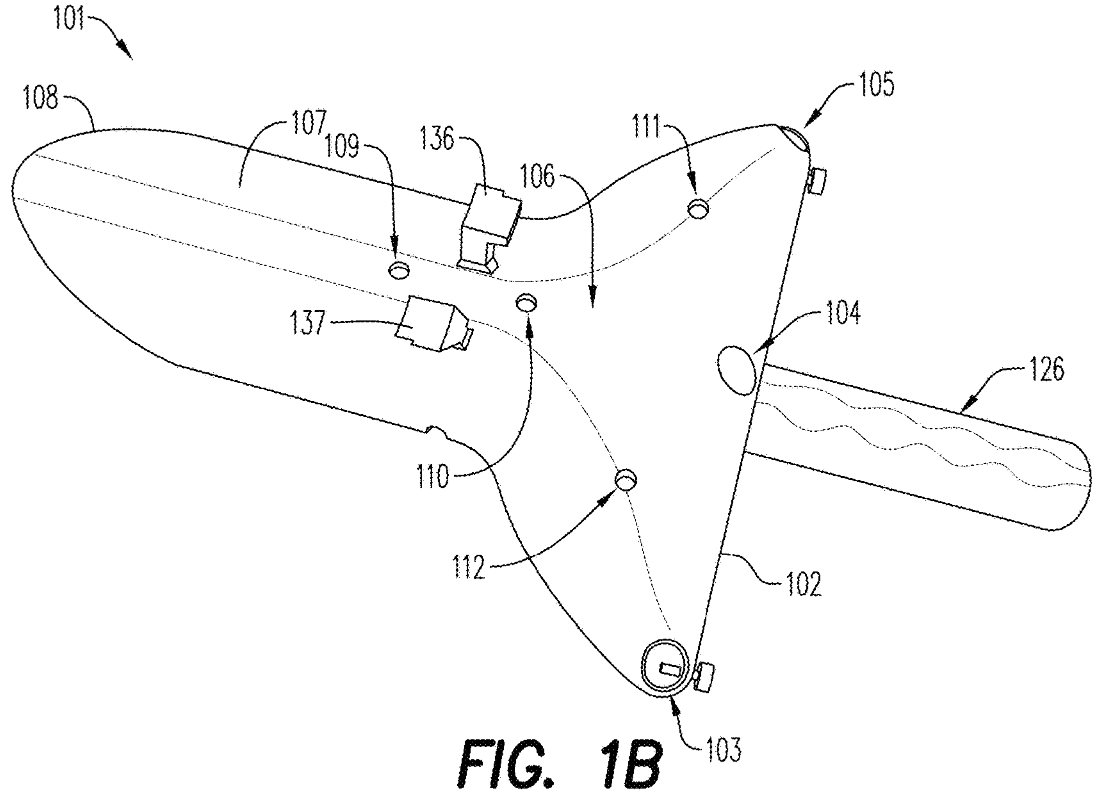
FIG. 1B is a bottom, perspective view of the vegetable support member according to aspects of the present disclosure.
Figure 2:
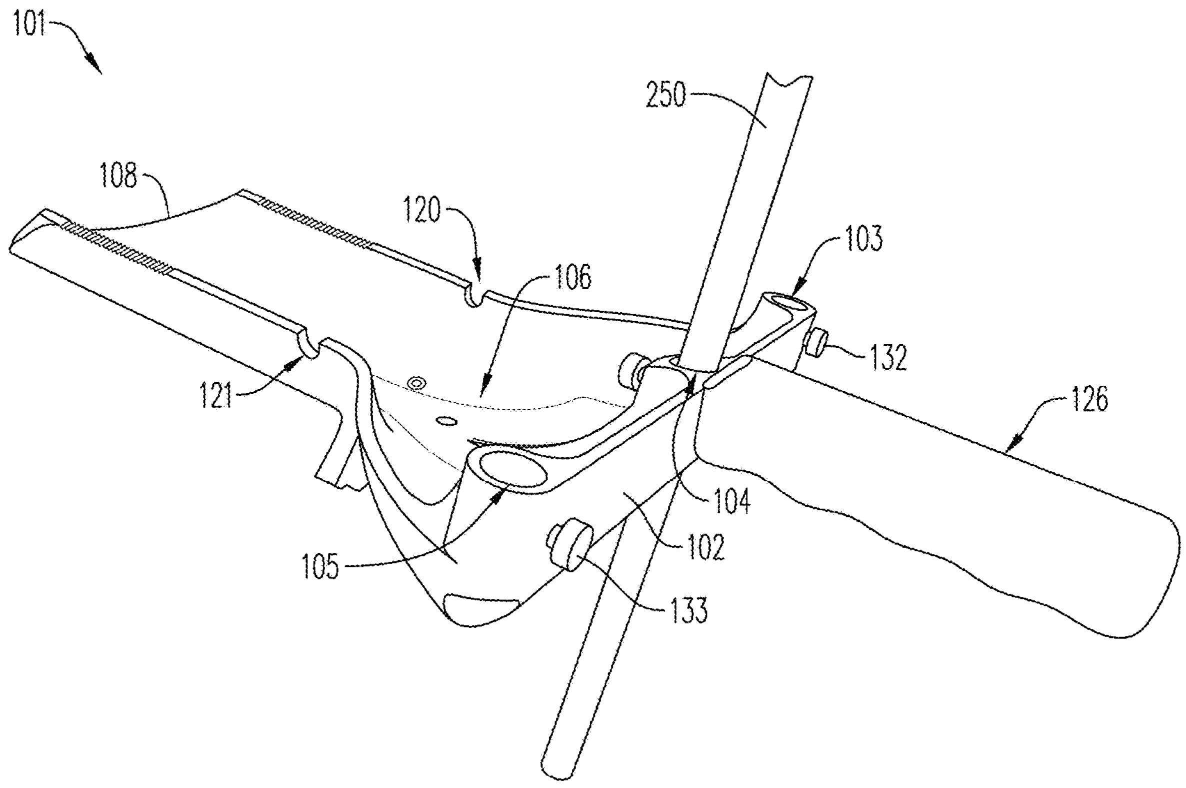
FIG. 2 is a lateral view of the vegetable support member with a vertical support member inserted in the first aperture according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

While various support members configured to support vegetables are described herein, the vegetable support members can similarly be employed to support plants other than vegetables.

Referring particularly to FIGS. 1A, 1B, 2, 4A, 4B, 5A, 5B, 6A, 6B, and 6C, a vegetable support member 101 includes a first sidewall 102 (see, e.g., 202 in FIG. 6B and 302 in FIG. 6C) that defines at least one first aperture (see, e.g., apertures 103, 104, and 105). The first aperture is configured to receive the vertical support member 250 (see, e.g., FIG. 2), thereby securing the vegetable support member 101 to the vertical support member 250. While three apertures are shown and described with respect to FIGS. 1A to 2, other vegetable support members shown and described herein may include more or less than two apertures configured to receive the vertical support member 250. For example, vegetable support members 401 and 501 may each include two apertures (see, e.g., apertures 403 and 405 in FIG. 13) configured to receive the vertical support member 250.

A base member 106 extends from the first sidewall 102. The base member 106 defines the vegetable support member's curved bottom surface 107. Additionally, the base member 106 defines a distal end portion 108 facing away from the first sidewall 102. The base member's distal end 108 defines a curved shape facing away from the first sidewall 102. The base member 106 and the first sidewall 102 may be a single integrally formed/unitary structure. As an example, the base member 106 and the first sidewall 102 may each include or may each be formed of a plastic, polymer, composite, or similar material (e.g., a material suitable for 3-D printing or injection molding). The base member 106 and the first sidewall 102 may each include, for example, Polyethylene (PE), Polypropylene (PP), Polyvinyl Chloride (PVC), Polystyrene (PS), Polyethylene Terephthalate (PET), Polyurethane (PU), Polycarbonate (PC), Acrylonitrile Butadiene Styrene (ABS), Nylon (Polyamide), or Polyvinylidene Fluoride (PVDF).

The first aperture (see, e.g., apertures 103, 104, and 105) may define a circular shape or a shape that corresponds with the shape of the vertical support member 250. In use, once inserted, the vertical support member 250 remains securely fashioned to the vegetable support member 101, contributing to the apparatus's stability, a feature that can be particularly valuable in outdoor conditions and while supporting vegetables as the vegetables grow. The vertical support member 250 may be similarly employed by the other vegetable support members 201, 301, 401, and/or 501 described herein (see, e.g., FIG. 7).

In use, the vertical support member 250 serves to provide stability and potentially allowing for height adjustment for the vegetable support members 101, 201, 301, 401, and/or 501. The vertical support member 250 offers a steady base, helping the apparatus withstand external factors like wind. Additionally, the design of this member may include features for adjusting its height, making it suitable for supporting various types of vegetables at different stages of growth. The connection between the vertical support member 250 and the vegetable support members 101, 201, 301, 401, and/or 501 ensures the apparatus functions effectively in a garden setting.

The vertical support member 250 of the vegetable support apparatuses 101, 201, 301, 401, and/or 501 may be constructed from a variety of materials, depending on the desired strength, durability, and weight. Materials for constructing the vertical support member 250 may include metals like steel or aluminum for robustness and longevity, or plastics, polymers and composite materials for lighter weight and potential cost-effectiveness. The selection of material would include such considerations as resistance to outdoor elements, ease of manufacturing, and overall impact on the apparatus's functionality and usability in a garden environment. As an example, the vertical support member 250 may include, for example, Polyethylene (PE), Polypropylene (PP), Polyvinyl Chloride (PVC), Polystyrene (PS), Polyethylene Terephthalate (PET), Polyurethane (PU), Polycarbonate (PC), Acrylonitrile Butadiene Styrene (ABS), Nylon (Polyamide), or Polyvinylidene Fluoride (PVDF).

The shape of the vertical support member 250 in the vegetable support apparatuses 101, 201, 301, 401, and/or 501 may be cylindrical or rectangular, optimized for easy handling, and structural stability. Its height could be adjustable or fixed, potentially ranging from a few feet to several feet (e.g., from about 1 foot to about 8 feet), to accommodate different plant sizes and gardening needs.

At least one second aperture (see, e.g., second apertures 109, 110, 111, and/or 112) is defined on the bottom surface 107 of the base member 106. The second aperture is configured, for example, to drain fluid through the base member 106.

The second aperture (see, e.g., second apertures 109, 110, 111, and/or 112) may define a circular or cylindrical shape. Additionally, the second aperture may be a different diameter or shape than the first aperture (see, e.g., apertures 103, 104, and 105). The second apertures may also define different sizes or different diameters from each other.

The second apertures are optimally arranged along the bottom of the base member to facilitate fluid drainage from the bottom surface 107 of the base member 106.

In an aspect of the present disclosure, the first sidewall 102 defines a plurality of first apertures wherein each first aperture is configured to receive the vertical support member 250. The plurality of first apertures may define a same shape as each other. The plurality of first apertures may be arranged linearly or staggered with respect to an axis extending perpendicularly to the extending direction of the base member 106.

The first apertures may be circular in shape. The specific shape is chosen to correspond to the vertical support member's 250 form, ensuring an optimal fit. The congruence in shape between the first aperture and the vertical support member 250 facilitates a snug and efficient assembly for the stability and functionality of the apparatus.

The curved base member 106 of the vegetable support apparatus is designed to enhance its functionality in garden settings. This component, extending from the first sidewall 102, may be characterized by a semi-circular curved bottom surface 107. The curvature can facilitate the stable support of various types of vegetables, preventing them from rolling off or being displaced. Additionally, the curvature can contribute to efficient water drainage, helping to keep the vegetables dry and healthy. The distal end portion 108 of the base member, facing away from the first sidewall 102, may also feature a curved design. This aspect of the base member's design not only adds to the aesthetic appeal of the apparatus but could also provide ergonomic benefits, making it easier to handle and maneuver during gardening activities.

In an aspect of the present disclosure, the base member 106 defines at least one first cradle 113 and at least one second cradle 114. The first and second cradles 113 and 114 are individually configured to support a vegetable. Similar cradles 413 and 414 are shown, for example, in FIG. 13, and may be separated by sidewall 415. At least one second sidewall 115 (see, e.g., FIGS. 1A and 4A) extends orthogonally from the base member 106. A similar sidewall 515 is shown for example, in FIG. 13. The second sidewall 115 at least partially separates the first and second cradles 113 and 114. This can prevent two vegetables from coming into contact with each other, which can prevent rotting or other damage to such vegetables. The second sidewall 115 also increases the structural rigidity of the base member 106, which can be particularly useful if the vegetable support member is employed as a shovel, as described herein.

The cradles 113 and 114 are designed to conform to the shape of various vegetables, providing stable and secure support. Additionally, the second sidewall 115 may prevent the vegetables from contacting each other, minimizing the risk of damage or displacement. The sidewall 115 not only helps in organizing the vegetables but also contributes to the overall structural integrity of the cradles, ensuring durability and effectiveness in a dynamic garden environment. A similar sidewall 415 may be included in vegetable support member 401 (see, e.g., FIG. 13).

This variety in aperture sizes (see, e.g., apertures 109, 110, 111, and 112) allows for greater flexibility and adaptability in the apparatus's function. The different diameters of these apertures can accommodate stems or shoots of various sizes, ensuring that a wide range of vegetables can be supported effectively. Additionally, the variation in aperture sizes can be beneficial for drainage purposes, allowing water to escape more efficiently and thus contributing to the health and maintenance of the vegetables. The presence of multiple apertures of varying diameters in the base member 106 thus enhances the versatility and practicality of the vegetable support apparatus in a garden setting.

The plurality of second apertures (see, e.g., apertures 109, 110, 111, and 112) may be arranged linearly or staggered along the bottom of the curved base member.

Unless otherwise indicated herein, vegetable support members 201, 301, 401, and 501 may have substantially the same arrangement as vegetable support member 101. Additionally, any feature described with respect to one embodiment of a vegetable support member is similarly applicable to another of the vegetable support members described herein. Thus, duplicative descriptions may be omitted herein.

Figure 3:
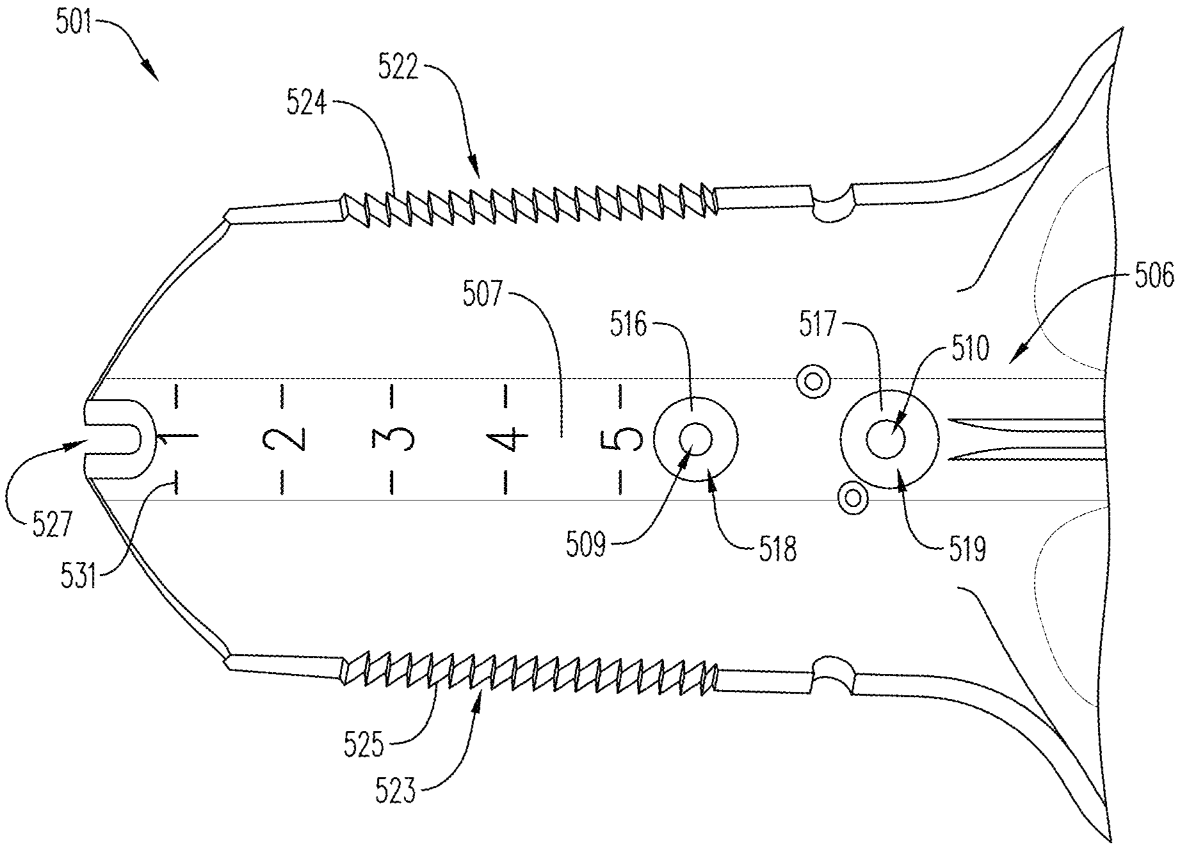
FIG. 3 is an enlarged, top plan view of the vegetable support member displaying the distal facing notch, a plurality of measurement markings, cutting edge, and drainage second apertures according to aspects of the present disclosure.
Figure 5A:
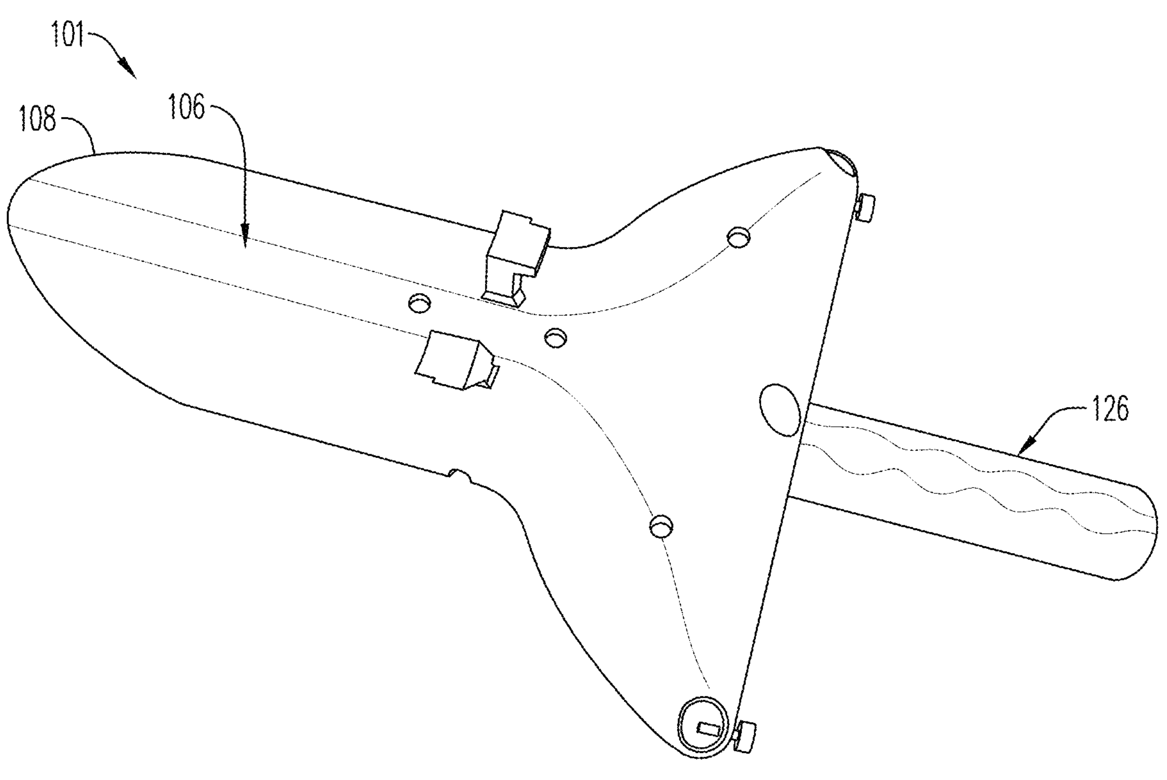
FIG. 5A is a bottom, perspective view of the vegetable support member displaying an exemplary notch configured to support a plant hook according to aspects of the present disclosure.
Figure 5B:
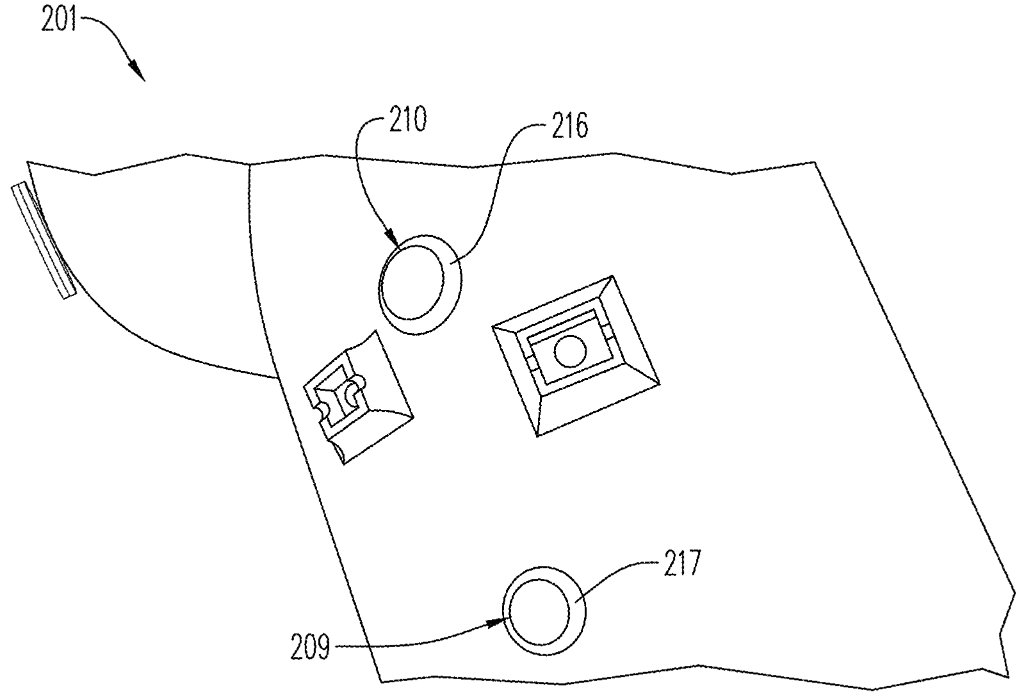
FIG. 5B is an enlarged, bottom, perspective view of the vegetable support member displaying the second aperture's projecting sidewalls extending downward according to aspects of the present disclosure.

Referring particularly to FIGS. 3 and 5B, the second apertures (e.g., second apertures 209 and 210 of vegetable support member 201, or second apertures 509 and 510 of vegetable support member 501) each define a projecting sidewall (see, e.g., projecting sidewalls 216 and 217 of vegetable support member 201 or projecting sidewalls 516 and 517 of vegetable support member 501). The projecting sidewall extends downward from the corresponding base member's bottom surface. The downward projecting sidewall is configured to sheer thorns from a stem as the stem is pulled upwardly through the corresponding aperture after having been inserted therein. This feature is particularly useful for handling vegetables or plants with thorny stems, as it aids in the safe and efficient removal of thorns, reducing the risk of injury or damage to the plant.

Figure 11:
FIG. 11 is a rear, perspective view of a vegetable support member, including a detachable dibber according to aspects of the present disclosure.
Figure 11:
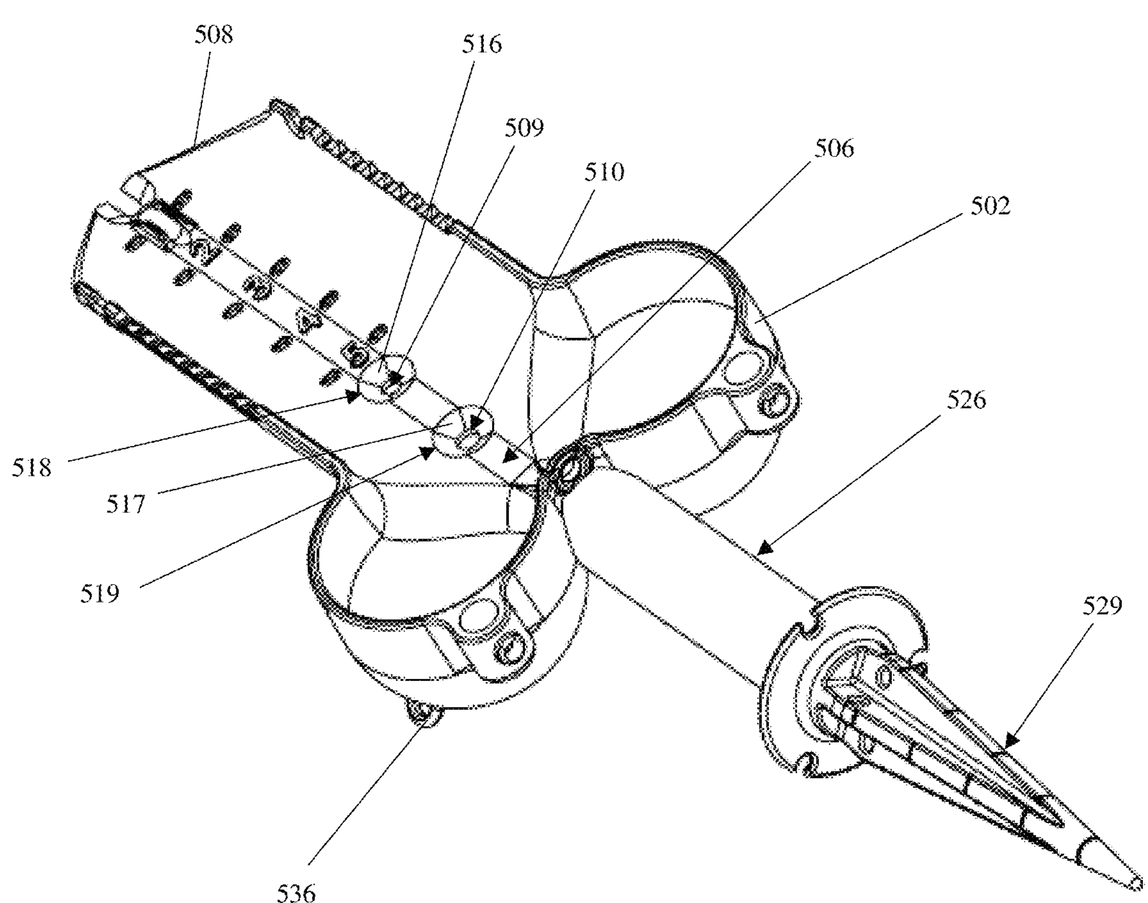
Figure 12:
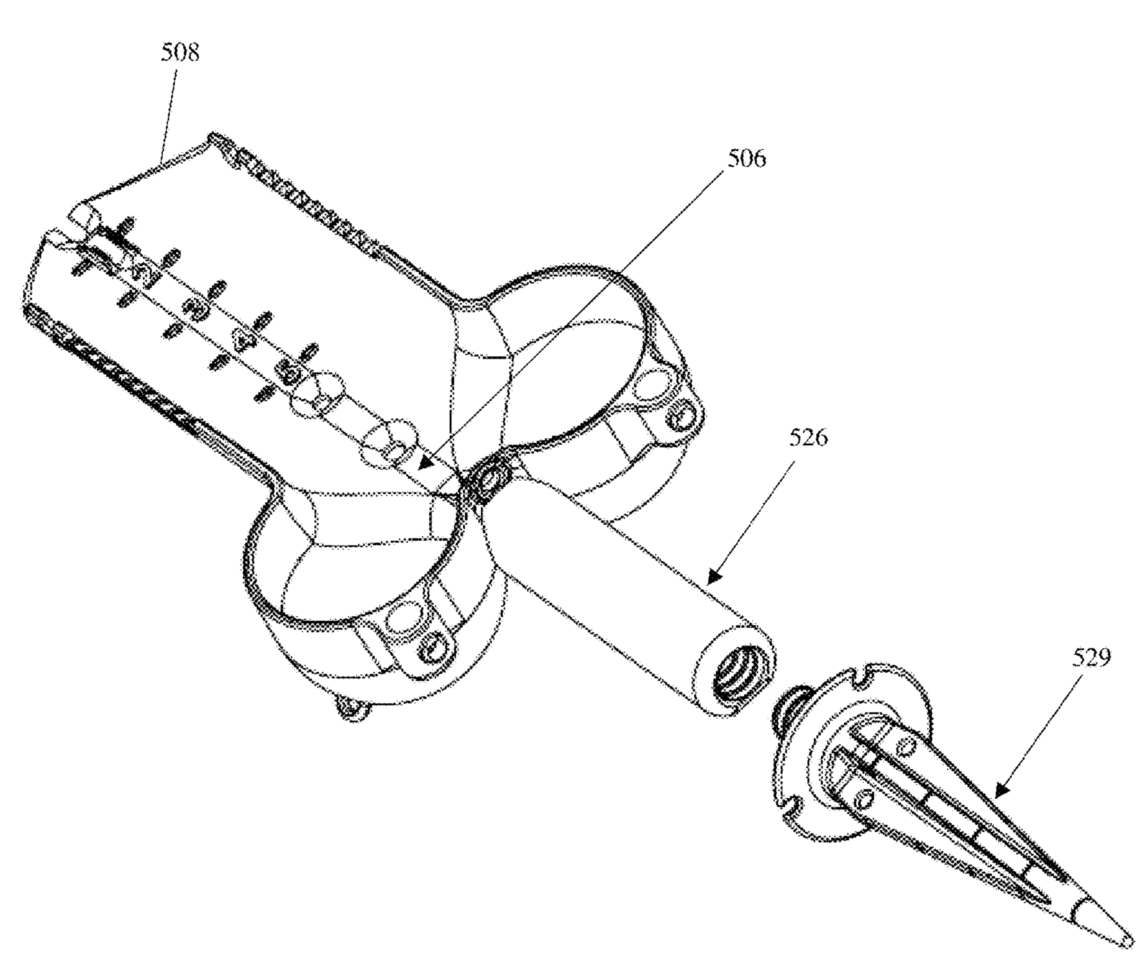
FIG. 12 is a rear, perspective view of the vegetable support member of FIG. 11.
Figure 13:
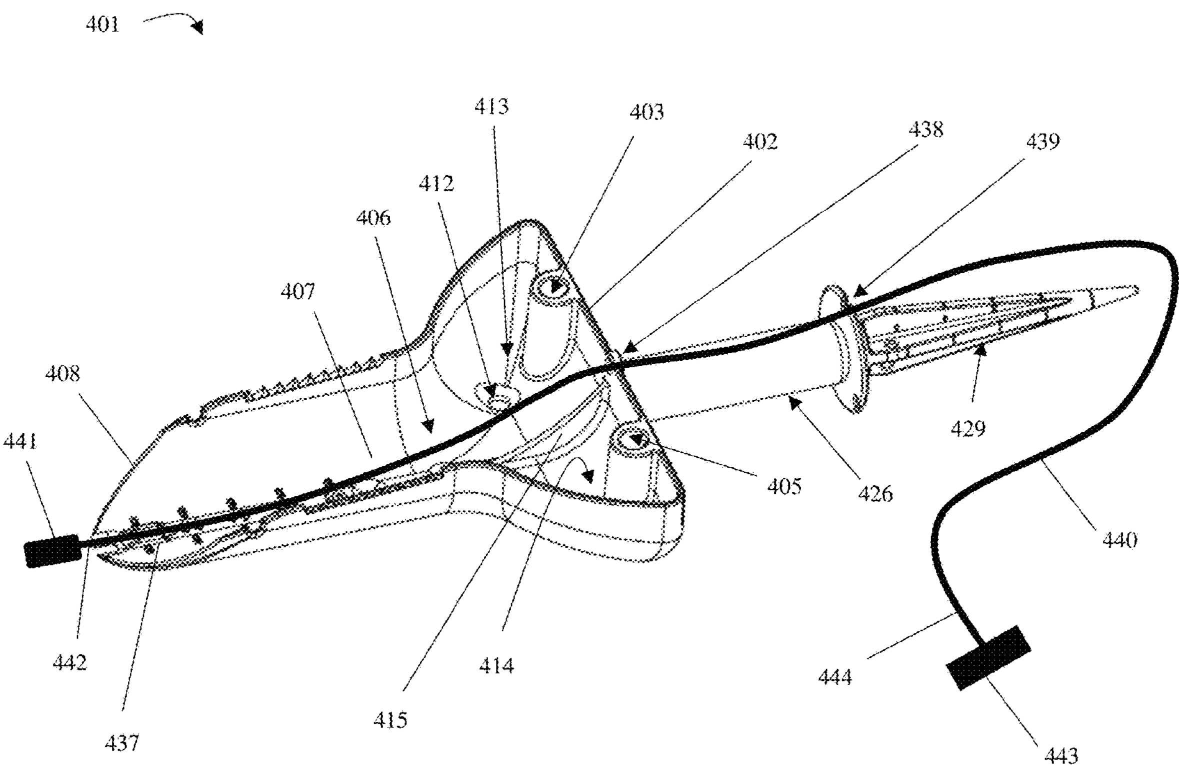
FIG. 13 illustrates an exemplary arrangement of a hose employable by a vegetable support member according to aspects of the present disclosure.

The downward sloped angle of the projecting sidewalls also helps with drainage through the bottom surface of the base member. Referring particularly to FIGS. 3, 11, and 13, a downwardly angled recess (see, e.g., recesses 412, 518 and 519) is formed in base member 506. The downwardly angled recess is configured to direct water into the at least one second aperture (e.g., apertures 509 or 510 in bottom surface 507 of base member 506).

The downwardly angled recess is specifically configured to channel water towards the at least one second aperture. The angle of the recess efficiently guides water toward the second aperture or distal end 508 of the base member 506, ensuring that any moisture accumulating on the bottom surface 507 of the base member 506 is effectively directed away. This feature is particularly valuable for drainage purposes, as it helps in preventing waterlogging around the plants supported by the apparatus. The directed flow of water into the second aperture ensures that excess moisture is removed from the vicinity of the vegetables, contributing to their overall health and reducing the risk of water-related issues such as rot or mold growth. The integration of this angled recess into the base member 506 enhances the apparatus's functionality in managing water.

In an aspect of the present disclosure, the base member includes at least one cutout or notch (see, e.g., cutouts 120 and 121 in FIGS. 1A and 2) on at least one side of the base member 106. The at least one cutout or notch is configured to support a plant hook.

The cutout or notch is configured to support a plant hook. The inclusion of the cutout or notch provides a dedicated space for attaching plant hooks, which may support climbing plants or vines. This design allows for the easy and secure attachment of hooks, facilitating vertical growth of certain vegetables or plants that require external support to thrive. The placement and sizing of the cutout or notch ensures that it can accommodate various hook sizes and styles, enhancing the apparatus's versatility. This addition to the base member 106 not only improves the utility of the vegetable support apparatus 101 but also contributes to a more organized and efficient gardening experience.

A plant hook is a functional accessory in gardening, primarily utilized to support and manage plants that climb or need to be elevated. Typically shaped like a hook or curved in design, it can be affixed to a variety of structures including trellises, stakes, and walls. This type of hook is also suitable for integration into garden support apparatuses, providing a versatile solution for plant management and support in various gardening contexts.

In an aspect of the present disclosure, the base members 106 or 506 each include at least one cutting edge (see, e.g., cutting edge 122 including cutting teeth 124 and cutting edge 123 including cutting teeth 125 in FIG. 1A, or cutting edge 522 including cutting teeth 524 and cutting edge 523 including cutting teeth 525 in FIG. 3) defined in at least one side of the base members 106 or 506. Similar cutting teeth 424 and/or 425 may be included in a cutting edge of vegetable support member 401 (see, e.g., FIG. 8).

The cutting edge is defined along at least one side of the base member. The inclusion of a cutting edge adds a functional dimension to the apparatus, allowing it to serve dual purposes: supporting plants and providing a tool for cutting. This feature can be particularly useful for tasks such as trimming plants, cutting twine or small branches, or other garden-related activities.

The base members 106 or 506 of the vegetable support apparatus 101 or 501, respectively, can include various types of cutting edges to enhance its utility. A straight edge offers general-purpose cutting suitable for slicing thin plant stems or bags, while a serrated or saw-tooth edge is ideal for tougher materials like thick stems or small branches. Scalloped edges, with their larger, rounded teeth, provide a good grip for certain cutting tasks. For precision work, a hollow ground edge can be employed. Alternatively, a wave edge, combining straight and serrated qualities, offers versatile cutting options. Additionally, a pruning edge, which may be curved or angled, is specifically useful for plant trimming tasks. The teeth of the opposing cutting edges described herein may define different shapes or sizes from each other.

The cutting edge on the base member of the vegetable support apparatus may be made from durable materials such as stainless steel or high-carbon steel, known for their strength and resistance to corrosion and wear. These materials ensure longevity and maintain sharpness over time, crucial for effective cutting. Additionally, the cutting edge may be an integrated component of the vegetable support member and be made from the same material as the vegetable support member. Alternatively, the cutting edge may be detachable or interchangeable, offering flexibility and adaptability for different gardening tasks. This feature allows for easy replacement, cleaning, or sharpening of the cutting edge, while also providing the option to switch between different types of edges, like serrated or straight, depending on the specific gardening requirement. The detachable nature of the cutting edge also facilitates convenient cleaning and maintenance, ensuring the apparatus remains functional and efficient for prolonged use in various garden environments.

As an example, the at least one cutting edge includes a plurality of teeth defining a serrated edge (see, e.g. FIG. 3). This serrated design is particularly effective for sawing through tougher plant materials, such as thick stems or branches, providing a more efficient cutting action than a straight edge. The presence of multiple teeth enhances the cutting ability, allowing for easier penetration and a smoother cutting motion. This type of edge is beneficial in a garden setting where a variety of cutting tasks may be encountered, offering versatility and increased functionality to the apparatus.

Figures 6A, 6B, 6C:
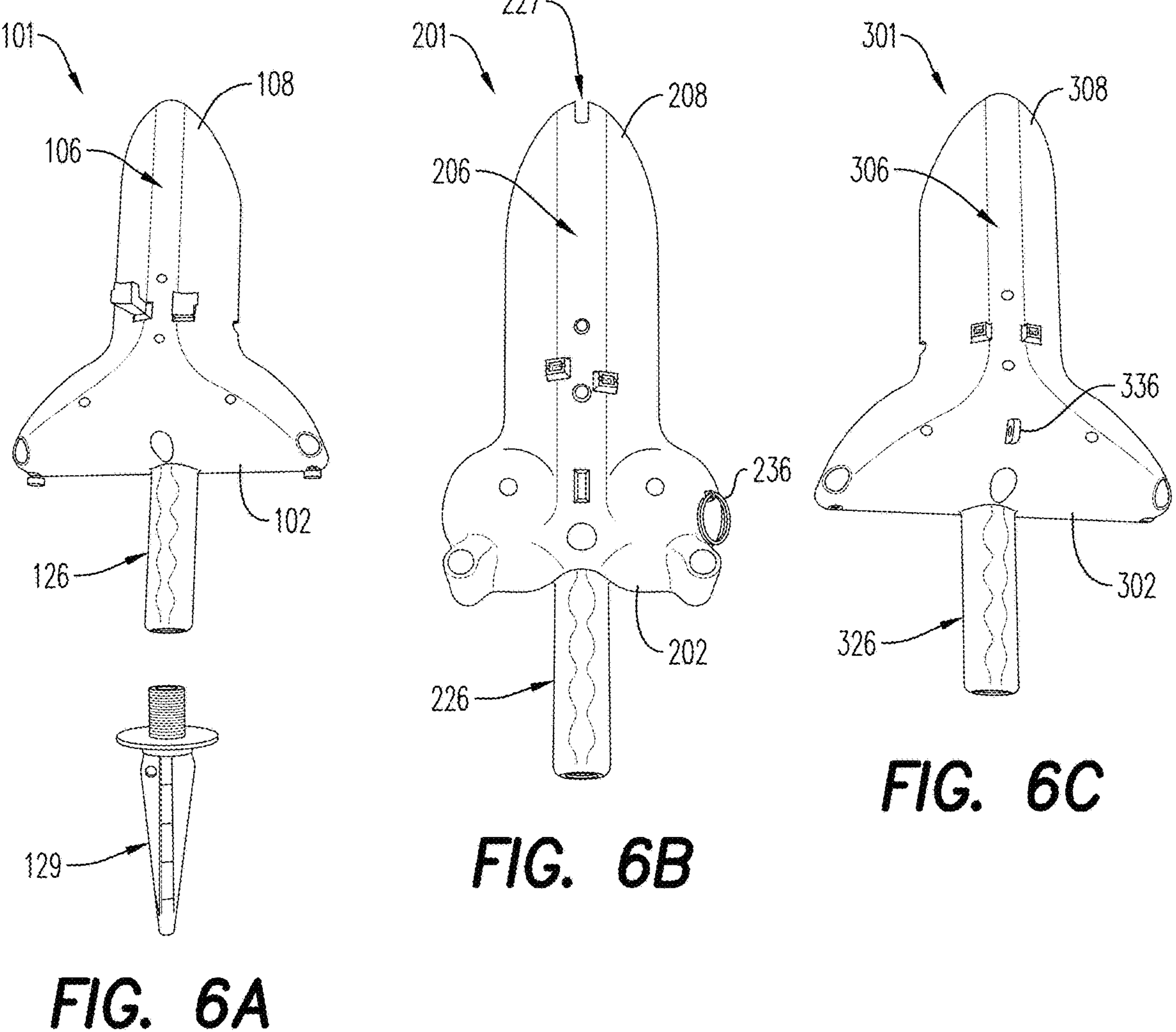
FIG. 6A is a bottom, perspective view of an exemplary vegetable support member and a removable dibber attachable via a threaded bore according to aspects of the present disclosure.
FIG. 6B is a bottom-up view of another exemplary vegetable support member with a distal cut out notch, plant ring, and two cradles according to aspects of the present disclosure.
FIG. 6C is a bottom, perspective view of another exemplary vegetable support member according to aspects of the present disclosure.
Figure 7:
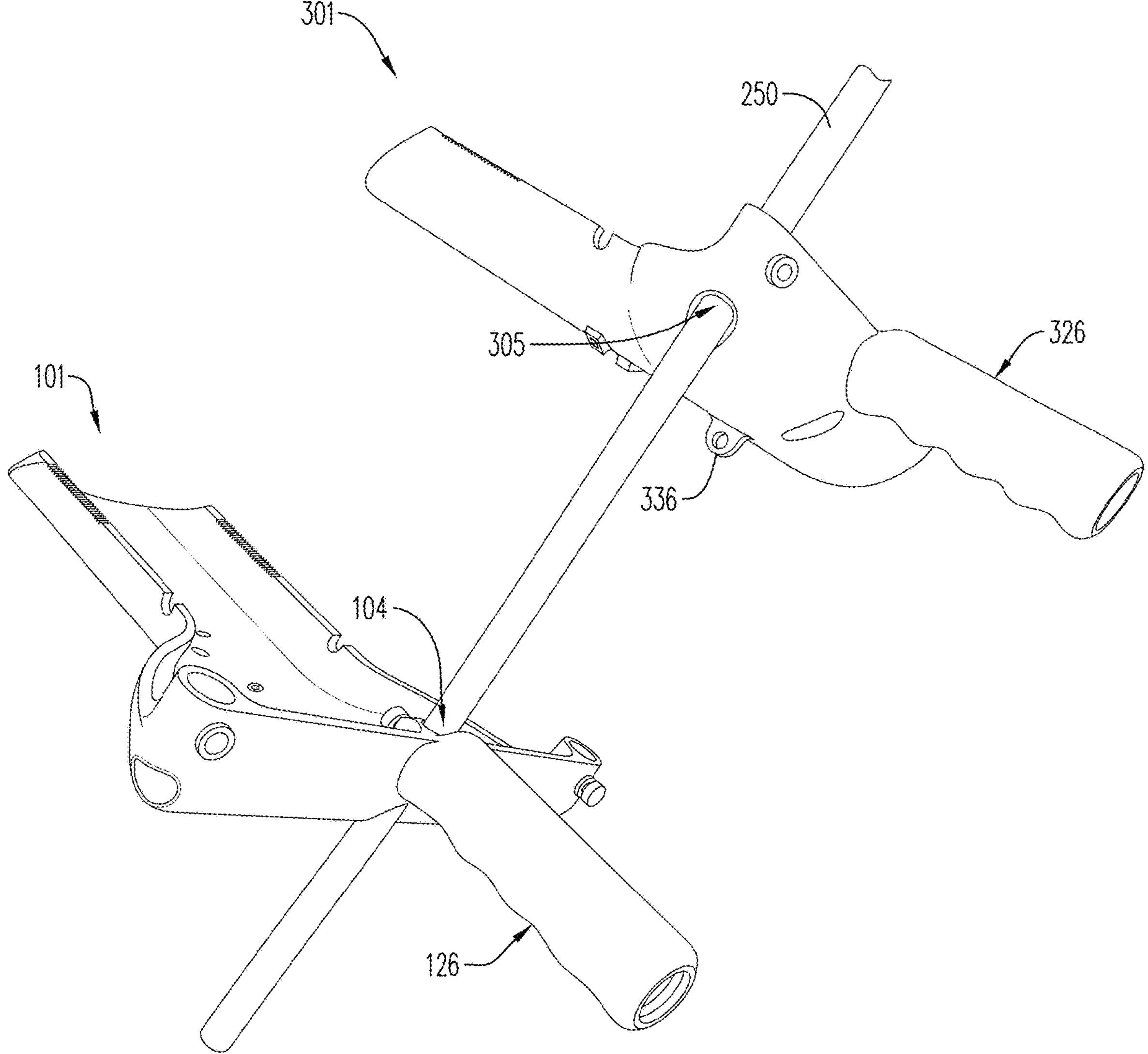
FIG. 7 is a lateral view of two vegetable support members arranged along a vertical support member according to aspects of the present disclosure.
Figure 8:
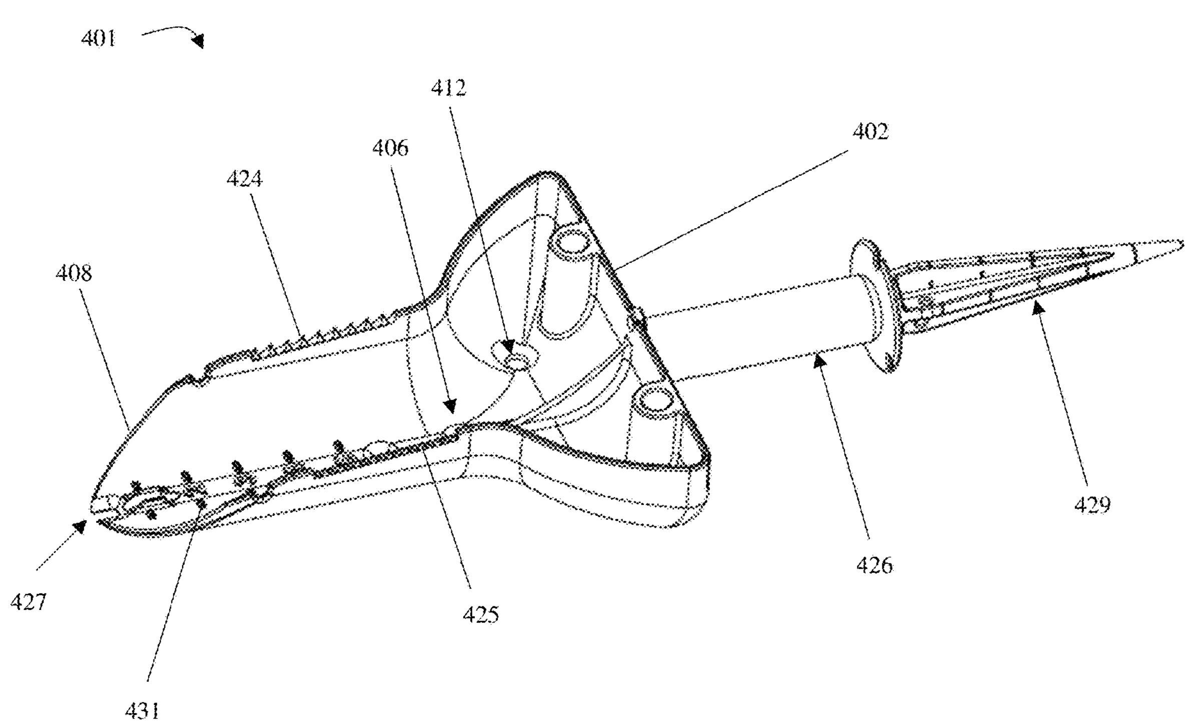
FIG. 8 is a top, perspective view of a vegetable support member, including a detachable dibber according to aspects of the present disclosure.
Figure 9:
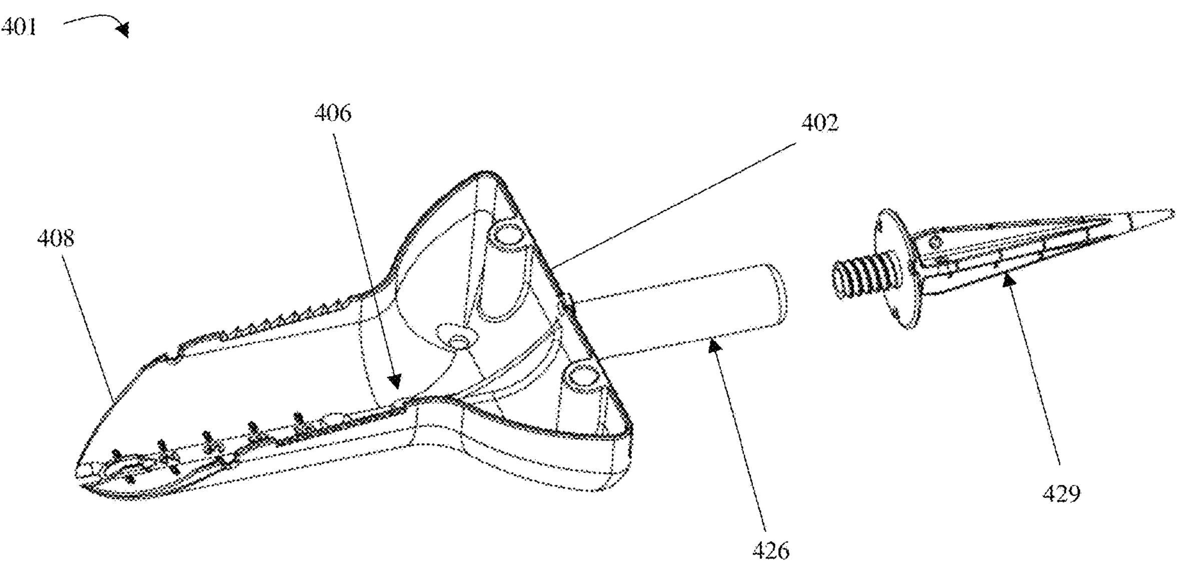
FIG. 9 is a top, perspective view of the vegetable support member of FIG. 8 with the dibber detached therefrom.

In an aspect of the present disclosure, the first sidewall includes at least one handle extending from the first sidewall (see, e.g., handle 126 of vegetable support member 101 in FIGS. 1A, 1B, 2, 4A, 4B, 5A, 6A, and 7, handle 226 of vegetable support member 201 in FIGS. 5B and 6B, handle 326 of vegetable support member 301 in FIGS. 6C and 7, handle 426 of vegetable support member 401 in FIGS. 8 and 9, and handle 526 of vegetable support member 501 in FIGS. 3, 11, 12, and 13).

Figure 4A:
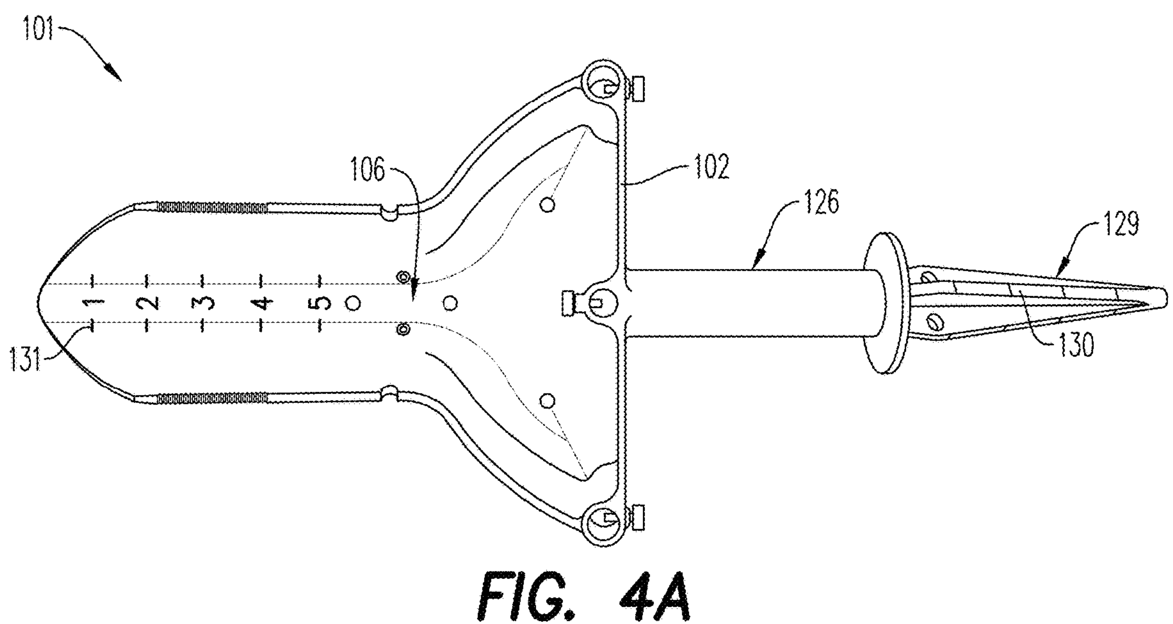
FIG. 4A is a top, perspective view of the couplable dibber tool attached to the vegetable support member's handle according to aspects of the present disclosure.
Figure 4B:
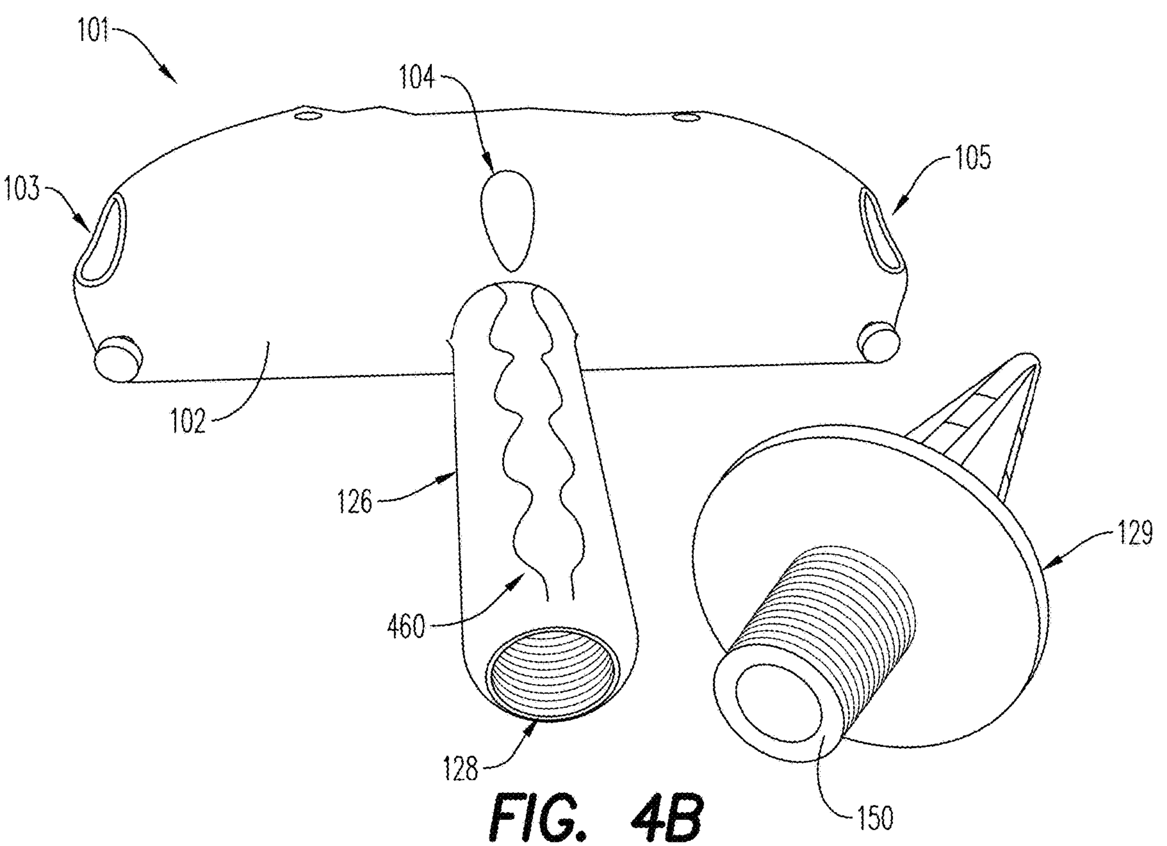
FIG. 4B is an enlarged view of the threaded bore of the vegetable support member's handle, and the dibber detached therefrom according to aspects of the present disclosure.

Referring particularly to FIG. 4B, the handle 126 transforms the vegetable support member 101 into a multifunctional tool, allowing it to be used as a shovel, for example. When a user holds this handle 126, the apparatus can be maneuvered for digging or moving soil, making it a versatile addition to gardening equipment; effectively combining the functionality of plant support with the practical utility of a shovel, providing gardeners with a tool that serves dual purposes. The inclusion of a handle 126 on the first sidewall 102 for shovel-like operation maximizes the utility and efficiency of the vegetable support apparatus 101 in various gardening tasks.

The handle 126 extending from the first sidewall 102 may be designed with specific considerations for shape to enhance usability and functionality. The shape of the handle 126 may be ergonomically curved or contoured to fit comfortably in the user's hand, reducing strain during prolonged use. The handle may include, for example, a number of finger grip contours 460. This ergonomic design can be crucial for gardeners who engage in repetitive tasks, as it helps in minimizing fatigue and discomfort. Additionally, the handle 126 might feature a non-slip surface or textured grip, providing better control and safety, especially in outdoor conditions where the handle may become wet or dirty. The size and diameter of the handle 126 may also be tailored to accommodate a range of hand sizes, ensuring that it is easily graspable and maneuverable. Furthermore, the handle 126 may be arranged with a slight angle relative to the first sidewall 102, optimizing the leverage and force application when used as a shovel. This angled design aids in more efficient soil digging or lifting, making the gardening process smoother.

Referring particularly to FIGS. 3, 6B, and 6C, the distal end (see, e.g., distal end 208 of vegetable support member 201, distal end 308 of vegetable support member 301, distal end 408 of vegetable support member 401, or distal end 508 of vegetable support member 501) of the base member (e.g., base member 206, 306, 406 or 506) defines at least one distal-facing notch (e.g., notch 227, 427 or 527). The at least one distal-facing notch is configured to securely grip a root.

The distal end notch is designed to grip roots securely. The configuration of this notch is such that it can accommodate and hold onto various root sizes and shapes, providing a firm grasp. This is particularly useful when dealing with plants that need to be uprooted or when roots require stabilization during gardening activities. The presence of this distal-facing notch adds a functional dimension to the apparatus, enhancing its utility not just as a support structure for vegetables, but also as a tool for effective root management.

The notch may potentially take several shapes. Potentially, the notch could include a V-shape, U-shape, or a forked design, each offering different benefits in terms of the size and type of roots they can grip. A V-shaped notch might be more suited for thinner, more delicate roots, providing a snug fit. In contrast, a U-shaped notch could offer a wider opening, ideal for thicker roots. A forked design might be beneficial for gripping multiple smaller roots simultaneously or for providing additional leverage.

Referring particularly to FIGS. 4A and 4B, the vegetable support member 101 may include a threaded bore 128 defined in handle 126. Additionally, a dibber 129 is configured to be removably coupled with the threaded bore 128 of the handle 126. The dibber 129 is configured to form a hole in a planting substrate.

The threaded bore 128 allows for the attachment of the dibber 129, which is configured to be removably coupled with the handle 126. The threaded design ensures a secure fit, providing stability during use. The dibber 129, a gardening tool, is designed to create holes in a planting substrate, such as soil. The threaded bore 128 may also be configured to receive another threaded attachment, such as a long handle to convert the vegetable support member 101 into a full length shovel.

Figure 10A:
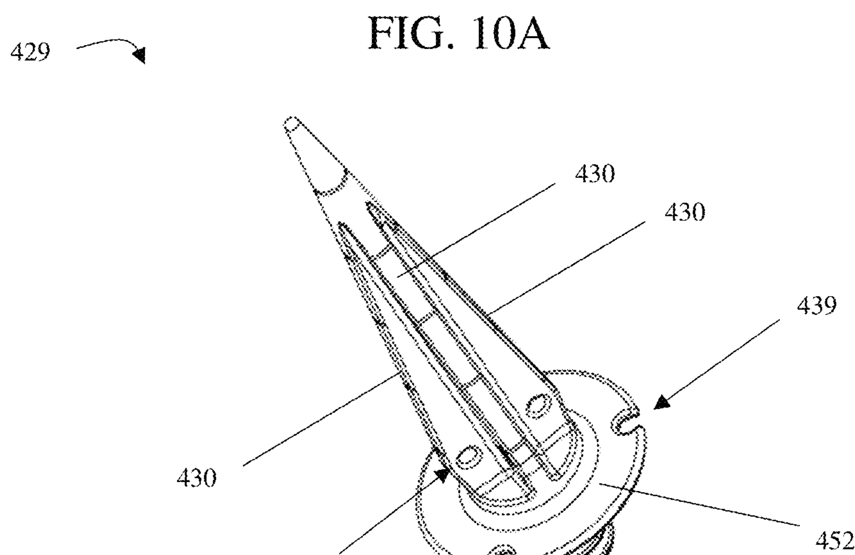
FIG. 10A is an enlarged, perspective view of the dibber of FIG. 8.
Figure 10B:
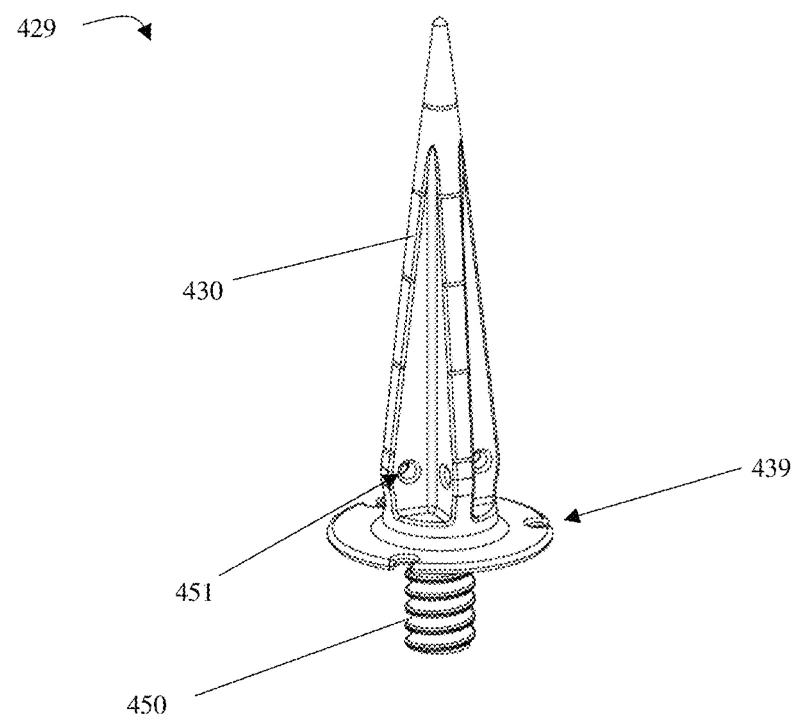
FIG. 10B is an enlarged, side view of the dibber of FIG. 8.

Referring particularly to FIGS. 4B, 10A and 10B, dibbers 129 and 429 may include a threaded projection 150 and 450, respectively, configured to be received in a corresponding threaded bore. A similar threaded projection may be included in dibber 529 (see, e.g., FIG. 11).

Planting substrates may refer to various physical mediums used for plant growth. These may include traditional soil, potting soil, black soil, mulch, or volcanic grave—each with distinct properties for plant cultivation. Compost may also be added to soil to improve its fertility and structure. Peat moss may be used to help moisture retention, while perlite and vermiculite are utilized to enhance soil aeration and drainage. Coconut coir, an alternative to peat moss possesses excellent water retention and aeration qualities. Sand, sometimes mixed with other substrates, is used to improve drainage, especially in cultivating plants like succulents and cacti. Ultimately, planting substrate may include one or more of these substrates either utilized individually or in combination with one another.

In an aspect of the present disclosure, the dibber (e.g., dibber 129 or 429) includes a plurality of fins (see, e.g., fins 130 or 430), extending from the dibber's sidewall (see, e.g., FIGS. 1A, 4A, 4B, 6A, 10A, and 10B). The fins are configured to remove material from the hole formed by the dibber. The dibbers described herein may also include a number of measurement notches, marks, or projections configured to indicate a depth of a hole being formed by the dibber. The fin(s) may each include at least one orifice (see, e.g., orifice 451 in FIGS. 10A and 10B) configured to receive a rope, string, or the like, or alternatively the orifice (e.g., 451) may be configured to receive a plant hook therein.

In an aspect of the present disclosure, the dibber (e.g., dibber 129 or 429) includes a hand blocking member (see, e.g., hand blocking member 452 in FIGS. 10A and 10B) configured to allow a user to apply increased pressure to the vegetable support member by pushing against the hand blocking member. The hose receiving orifice (e.g., 439) described herein may be formed in the hand blocking member (e.g., 452).

The fins may be configured to facilitate the removal of material from a hole as the dibber is used. Each fin is designed to effectively scoop or push soil away, clearing the hole as it's being created. This feature is particularly useful when working with compact or heavy soils, where removing excavated material can be challenging. The fins enhance the efficiency of the dibber, making the task of hole preparation for planting both quicker and easier. The fins on the dibber's sidewall aid in the practical aspect of digging and contribute to a more uniform and precise hole.

In an aspect of the present disclosure, the base member, dibber, or both defines a plurality of measurement markings (see, e.g., markings 131, 431, and 531 in FIGS. 1A, 3, and 8) configured to indicate a depth of insertion into soil. Each of the markings may be formed as an indent, protrusion, or surface marking, and may include a numeric indicator of depth that is similarly formed.

The measurement markings on the base member or dibber of the vegetable support assembly may include metric units such as centimeters and millimeters, which are widely recognized and used globally. Alternatively, the base member may utilize imperial system units such as inches. These units provide precise and easily understandable measurements for gardeners. Centimeters, millimeters, and inches offer the granularity needed for accurate depth measurement, essential for seeding plants at specific depths or ensuring uniformity in transplanting.

In an aspect of the present disclosure, the vegetable support assembly includes at least one threaded bolt (see, e.g., bolts 132 and 133 in FIG. 1A) configured to be threaded into at least one bore (see, e.g., bores 134 and 135 in FIG. 1A) extending into the at least one first aperture (see, e.g., apertures 103, 104, and 105 in FIG. 1A), allowing the vegetable support member to be removably couplable to the vertical support member. A similar threaded bolt may be received in orifice 305 (see, e.g., FIG. 7).

The threaded bolt may be designed to be threaded into at least one bore that extends into the first aperture of the vegetable support member. The inclusion of this threaded bolt system allows for the vegetable support member to be removably coupled to the vertical support member. This design provides flexibility and convenience in the assembly and disassembly process, enabling easy adjustments, maintenance, or storage of the apparatus. The removable nature of the coupling also allows for customization according to specific gardening needs or for adapting to different stages of plant growth.

In an aspect of the present disclosure, the vegetable support member includes at least one projection extending downwards from the bottom surface of the base member (see, e.g., projections 136, 137, 236, 336, and 536 in FIGS. 1B, 6B, 6C, and 11). Each projection is configured to connect with at least one string or rope. Each projection may be formed as a ring, loop, projection, or the like.

The downward projection may be designed to facilitate connection with at least one string or rope. The inclusion of this projection adds additional functionality to the apparatus, allowing for the tying or anchoring of the support structure to additional stabilizing elements. This can be particularly useful in outdoor garden settings where wind or uneven terrain might affect the stability of the support. By enabling the attachment of strings or ropes, the vegetable support member can be more securely anchored, providing enhanced support for the vegetables it holds. This feature not only increases the apparatus's versatility in various gardening situations but also contributes to the reliability of the support system.

The vegetable support apparatus may be constructed from an array of materials, including plastic, rubber, wood, metal, bamboo, fiberglass, and/or composite materials. Plastics utilized may include high-density polyethylene, polyvinyl chloride, or other lightweight, durable plastics that are resilient to weather, chemicals, and rot. Metals utilized may include aluminum, stainless steel, or coated steel. Woods utilized may include either natural wood or treated woods such as cedar, redwood, or pressure-treated pine, which are capable of naturally resisting rot and pests. Composite materials may include wood fibers and recycled plastics.

In use, a series of vegetable support apparatuses may be utilized in a series along the same vertical support member. Each support apparatus may be configured to support vegetables from the same or different plants along the same vertical support member.

The vegetable support apparatus may be affixed to the top-end portion of the vertical support member and be readily detached by a user to access the vegetable support member's multifunctional features.

Referring particularly to FIGS. 8 to 13, the vegetable support members 401 and 501 includes a hose support bracket (see, e.g., bracket 437 in FIG. 13 formed in bottom surface 407 of base member 406) arranged at the distal end portion of the base member (see, e.g., base members 406 of vegetable support member 401 and 506 of vegetable support member 501). A hose receiving orifice (see, e.g., orifice 438 in FIG. 13) is defined in the first sidewall (see, e.g., sidewall 402 of vegetable support member 401 and sidewall 502 of vegetable support member 501).

In an aspect of the present disclosure, a second hose receiving orifice (see, e.g., orifice 439) is defined in the dibber. The hose support bracket 437 may be "C" or "U" shaped. The hose support bracket 437 is configured to hold the distal end portion 442 of the hose 440 therein.

The hose support bracket 437, and the hose receiving orifices 438 and 439 are arranged to be aligned with each other to secure the hose 440, such as for watering a lawn, vegetables, or plants. Orifices 438 and 439 may each define a closed circular orifice configured to circumferentially surround the hose 440. Alternatively, the orifices 438 and/or 439 may define U-shaped openings configured to pass hose 440 through upper portions thereof. The orifices 438 and 439 may be dimensioned to snuggly fit against the lower and side portions of hose 440 to hold the hose 440 therein.

Referring particularly to FIG. 13, the hose 440 is configured to extend from the hose support bracket 437 and through the hose receiving orifices 438 and 439. The hose 440 may include an adapter, such as a step down adapter configured to reduce a standard garden hose down to a smaller hose size, such as a ¼ inch hose size. The hose 440 may include a misting end attached thereto. The hose 440 may also include a shutoff valve connected between the proximal and distal ends of the hose 440 that can be utilized to shut off the spraying of water locally without the need to turn off a connected garden hose. The sprayed mist facilitated by the misting adapter of the hose 440 may be employed to mist plants, or to mist a user.

In an aspect of the present disclosure, a nozzle 441 is supported at the distal end 442 of the hose 440 and a hose connecting assembly 443 configured to connect the hose 440 with a source of water is arranged at a proximal end 444 of the hose 440.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A vegetable support assembly, comprising:
- a vertical support member;
- a vegetable support member configured to be arranged along the vertical support member, wherein the vegetable support member includes:
  - a first sidewall, wherein the first sidewall defines a plurality of first apertures, wherein each first aperture of the plurality of first apertures is configured to receive the vertical support member therein;

a base member extending from the first sidewall, wherein the base member defines a bottom surface defining a curved shape, and wherein the base member defines a distal end portion facing away from the first sidewall, wherein the distal end portion of the base member defines a curved shape facing away from the first sidewall;

at least one second aperture defined in the bottom surface of the base member, wherein the at least one second aperture is configured to drain fluid through the bottom surface of the base member, wherein the at least one second aperture defines a projecting sidewall extending downward from the bottom surface of the base member, wherein the projecting sidewall is configured to shear thorns from a stem when the stem is pulled upwardly through the at least one second aperture;

at least one first cradle defined by the base member, wherein the at least one first cradle is configured to support a first vegetable therein;

at least one second cradle defined by the base member, wherein the at least one second cradle is configured to support a second vegetable therein; and at least one second sidewall extending orthogonally from the base member and extending from the first sidewall, wherein the at least one second sidewall is configured to at least partially separate the at least one first cradle from the at least one second cradle.

2. The vegetable support assembly of claim 1, wherein the at least one second aperture includes a plurality of second apertures, wherein the second apertures of the plurality of second apertures define different diameters from each other.

3. The vegetable support assembly of claim 1, further including a downwardly angled recess formed in the base member, wherein the downwardly angled recess is configured to direct water into the at least one second aperture.

4. The vegetable support assembly of claim 1, further including at least one cutout or notch defined in at least one side of the base member, wherein the at least one cutout or notch is configured to support a plant hook.

5. The vegetable support assembly of claim 1, further including at least one cutting edge defined in at least one side of the base member.

6. The vegetable support assembly of claim 5, wherein the at least one cutting edge includes a plurality of teeth defining a serrated edge.

7. The vegetable support assembly of claim 1, further including at least one handle extending from the first sidewall, wherein the vegetable support member is configured to operate as a shovel by holding the handle.

8. The vegetable support assembly of claim 7, wherein the distal end portion of the base member defines at least one distal-facing notch, wherein the at least one distal-facing notch is configured to securely grip a root.

9. The vegetable support assembly of claim 7, further including:

a threaded bore defined in the at least one handle; and a dibber configured to be removably coupled with the threaded bore of the handle, wherein the dibber is configured to form a hole.

10. The vegetable support assembly of claim 9, wherein the dibber includes a plurality of fins extending from a sidewall thereof, wherein the fins of the plurality of fins are configured to remove material from the hole.

11. The vegetable support assembly of claim 10, wherein at least one of the base member or the dibber defines a plurality of measurement markings configured to indicate a depth of insertion into soil.

12. The vegetable support assembly of claim 1, further including at least one threaded bolt configured to be threaded into at least one threaded bore extending into a first aperture of the plurality of first apertures to removably couple the vegetable support member with the vertical support member.

13. The vegetable support assembly of claim 1, further including at least one projection extending downward from the bottom surface of the base member, wherein the at least one projection is configured to connect with at least one string or rope.

14. The vegetable support assembly of claim 1, further including:

at least one handle extending from the first sidewall, wherein the vegetable support member is configured to operate as a shovel by holding the handle; and a threaded bore defined in the at least one handle, wherein the threaded bore is configured to removably receive and support at least one accessory product.

15. The vegetable support assembly of claim 1, wherein at least a portion of the vegetable support member is formed from polypropylene.

16. The vegetable support assembly of claim 1, wherein the at least one first cradle and at least one second cradle each define a concave shape configured to retain a vegetable therein.

17. A vegetable support member, comprising:

a first sidewall, wherein the first sidewall defines a plurality of first apertures, wherein each first aperture of the plurality of first apertures is configured to receive a vertical support member therein;

a base member extending from the first sidewall, wherein the base member defines a bottom surface defining a curved shape, and wherein the base member defines a distal end portion facing away from the first sidewall, wherein the distal end portion of the base member defines a curved shape facing away from the first sidewall;

at least one second aperture defined in the bottom surface of the base member, wherein the at least one second aperture is configured to drain fluid through the bottom surface of the base member, wherein the at least one second aperture defines a projecting sidewall extending downward from the bottom surface of the base member, wherein the projecting sidewall is configured to shear thorns from a stem when the stem is pulled upwardly through the at least one second aperture;

at least one first cradle defined by the base member, wherein the at least one first cradle is configured to support a first vegetable therein;

at least one second cradle defined by the base member, wherein the at least one second cradle is configured to support a second vegetable therein; and at least one second sidewall extending orthogonally from the base member and extending from the first sidewall, wherein the at least one second sidewall is configured to at least partially separate the at least one first cradle from the at least one second cradle.

18. The vegetable support member of claim 17, further including:

a hose support bracket arranged at the distal end portion of the base member;

a hose receiving orifice defined in the first sidewall;

at least one handle extending from the first sidewall, wherein the vegetable support member is configured to operate as a shovel by holding the handle;

a threaded bore defined in the at least one handle;

a dibber configured to be removably coupled with the threaded bore of the handle, wherein the dibber is configured to form a hole;

a second hose receiving orifice defined in the dibber;

a hose configured to extend from the hose support bracket and through the hose receiving orifice and the second hose receiving orifice;

a nozzle supported at a distal end of the hose; and a hose connecting assembly configured to connect the hose with a source of water.

19. The vegetable support member of claim 17, wherein at least a portion of the vegetable support member is formed from polypropylene.

* * * * *